United States Patent [19]

Mengel

[11] Patent Number: 4,883,331
[45] Date of Patent: Nov. 28, 1989

[54] METHOD OF AND STRUCTURE FOR THE JOINING OF SUBSTANTIALLY RIGID PARTS TOGETHER

[76] Inventor: Craig Mengel, 2114 Robinson Street, Regina, Saskatchewan, Canada, S4T 2P7

[21] Appl. No.: 221,120

[22] Filed: Jul. 19, 1988

[30] Foreign Application Priority Data

Jul. 24, 1987 [CA] Canada ................................ 548982

[51] Int. Cl.⁴ .......................................... A47B 17/00
[52] U.S. Cl. ..................................... 312/195; 403/14
[58] Field of Search ................ 220/4 F; 403/13, 14; 108/157, 159; 312/257 R, 111, 195

[56] References Cited

U.S. PATENT DOCUMENTS

| | | |
|---|---|---|
| 2,549,943 | 4/1951 | Snider . |
| 2,681,483 | 6/1954 | Morawetz ..................... 403/14 X |
| 3,079,207 | 2/1963 | Deaton . |
| 3,346,311 | 10/1967 | Bears . |
| 3,401,995 | 9/1968 | Ogden . |
| 3,479,102 | 11/1969 | Wallach et al. . |
| 3,807,823 | 10/1974 | Rouse . |
| 4,186,976 | 2/1980 | Okada . |
| 4,271,566 | 6/1981 | Perina ..................... 52/DIG. 13 X |
| 4,372,224 | 2/1983 | Ehrlich ..................... 297/DIG. 6 |
| 4,635,418 | 1/1987 | Hobgood ..................... 52/DIG. 13 |

Primary Examiner—Joseph Falk
Attorney, Agent, or Firm—Irell & Manella

[57] ABSTRACT

Conventionally, substantially rigid parts such as panels and the like, are joined by mechanical fitments or couplers which not only require tools to assemble and disassemble but also create concentrated stress points at the junctions where the fitments or couplers are located. The present device utilizes hook and loop coupling material to detachably secure the parts together and incorporate mechanical location and aligning means between the two parts just prior to the engagement of the hook and loop fastener portions with one another thus facilitating the accurate assembly of the parts. Although designed primarily for use in various types of knock-down furniture and the like, it can of course be adapted for use with other substantially rigid parts.

2 Claims, 4 Drawing Sheets

METHOD OF AND STRUCTURE FOR THE JOINING OF SUBSTANTIALLY RIGID PARTS TOGETHER

BACKGROUND OF THE INVENTION

This invention relates to new and useful improvements in method and structure for attaching two or more substantially rigid parts together and although the majority of the description and the illustrations refer to knock-down furniture of one form or another, nevertheless it will be appreciated that the method and structure can readily be adapted for use with other assemblies whether made of wood, plastic or metal.

The conventional way of securing such parts together utilizes a variety of fastening devices all of which consist of various fitments or couplers requiring tools to assemble and disassemble same and which, in use, create a concentrated stress point at the junction which is often weakened and sometimes breaks away when stresses are applied such as in moving the assembled parts without disassembly beforehand.

Furthermore in order to attempt to provide the necessary strength at the location of said fitments or couplers, the thickness of the material utilized in the construction of the parts is often increased considerably adding to the cost and usually, when a pressed wood is used, utilizing a less dense material than is available in thinner cross-sections.

Insofar as furniture is concerned, whether it be office furniture or home-use furniture, it may be shipped already assembled or, in a knocked down condition.

If already assembled, it will be appreciated that shipping space and storage space is considerable and the transferral of such assembled furniture is sometimes difficult particularly when narrow staircases, doorways and the like are encountered.

Knocked-down furniture is becoming increasingly popular largely due to the speed and ease of assembly and the less space required for both storage and transportation.

However conventional knocked-down furniture is still somewhat difficult to assemble on-site and normally requires at least two operators.

As an example, an office desk may be shipped conventionally in some five packages containing six pieces and once these are unpacked, the following steps are required in order to assemble the desk.

First the top of the desk is turned upside down upon the floor whereupon one end panel is placed upside down on the top panel aligning and engaging the male and female fitments and securing same usually by use of a screwdriver or wrench, in order to turn screws into all of the female fitments to secure and tighten the end panel upon the top of the desk.

Male fitments of the back panel are then engaged into the bottom of the top of the desk and the male fitments of the back panel are engaged with the female fitments of the side of the end panel whereupon the screws are tightened in all of the female fitments in order to secure these panels.

The other end panel is attached in a similar manner as described and then the drawers are taken out of the pedestals which may then be turned upside down and aligned so that the male fitments engage with the female fitments on the bottom of the desk top. All of the fitments are then tightened with a screwdriver or wrench and the desk can then be turned over to the upright position. This usually requires two assemblers in order to prevent damage from occurring to the desk. However some considerable strain is placed upon the fitments or couplers during this operation. Once turned upright, the drawers may be placed back in the pedestals.

PRIOR ART

Prior art known to applicant is as follows:

U.S. Pat. No. 3,079,207, C. U. Deaton, Feb. 26, 1963. This discloses a bi-level desk utilizing conventional screw type fasteners and brackets.

U.S. Pat. No. 3,401,995, B. R. Ogden, Sept. 17, 1968. This shows knock-down desks, tables and the like furniture detachably secured together by brackets, bolts, clamps and the like.

U.S. Pat. No. 2,549,943, L. Snider, Apr. 24, 1951. This teaches a knock-down desk having metal bracket fasteners, hinges and the like.

U.S. Pat. No. 3,479,102, M. K. Wallach et al, Nov. 18, 1969. This patent discloses furniture construction including a sub-assembly in which a rigid three-box unit is provided with finish panels attached to the sub-assembly and includes bulkheads for strength. A U-shaped member extends to the top of the desk and a pair of flat bar members are welded to the U-shaped member through pins and screws are utilized to secure the various parts together.

U.S. Pat. No. 3,346,311, W. W. Bears, Oct. 10, 1967. This includes a bolted assembly engagable in U-shaped cutouts or keyhole type cutouts together with hinged latches engaged by screws.

U.S. Pat. No. 3,807,823, George T. Rouse, Apr. 30, 1974. This patent discloses a lightweight corrugated collapsible desk with interlocking panels and tabs to hold the panels in position once folded.

U.S. Pat. No. 4,186,976, A. Okada, Feb. 5, 1980. Disclosed is a fabricated desk in which the components are rigidly interconnected by locking devices interposed between locking mechanism mounting apertures provided at suitable locations.

The present invention overcomes disadvantages inherent with conventional fitments or couplers for rigid panels, structures or the like by utilizing hook and loop material such as "Velcro" TM which includes two portions coupled together, one portion consisting of rows of hooks and the other portion comprising a mass of small loops. When these two portions are pressed together, they form a highly secure closure yet can easily be reopened with a relatively simple peeling action.

In combination with the hook and loop fastening means, a mechanical aligning system is utilized so that the two parts to be fastened together by the hook and loop fastening material can be perfectly aligned one with the other just prior to the mating of the two portions of the hook and loop fastening material. It will of course be understood that without some method of aligning the parts accurately prior to coupling the hook and loop portions, considerable difficulty can be experienced in accurate alignment.

In accordance with the invention there is provided a knock-down kit of substantially rigid parts and means adapted to detachably secure said parts together in the desired relationship, said means including one portion of a hook and loop fastening material secured to one of said parts and the other portion of said hook and loop fastening material to the other of said parts and means to mechanically align said parts in the desired relationship one with the other just prior to engaging the said hook and loop portions together in detachable fastening relationship.

Another aspect of the invention is to provide a method of attaching the substantially rigid furniture component parts together consisting of the steps of attaching one portion of a hook and loop fastening material to one of said component parts and the other portion of said hook and loop fastening material to the other component part, mechanically aligning said parts together and then engaging said hook and loop portions together in detachable fastening relationship.

A still further aspect of the invention consists of knock-down furniture which includes at least two substantially rigid parts, means to detachably secure said parts together in the desired relationship one with the other, said means including attaching one portion of a hook and loop fastening material to one of said parts and attaching the other portion of said hook and loop fastening material to the other of said parts, and means to mechanically align said parts in the desired relationship prior to engaging said hook and loop portions together in detachable fastening relationship.

A further aspect of the invention includes means for detachably securing substantially rigid panels together to form furniture and the like, said means including at least two substantially rigid parts, means to detachably secure said parts together in the desired relationship one with the other, said means including attaching one portion of a hook and loop fastening material to one of said parts and attaching the other portion of said hook and loop fastening material to the other of said parts, and means to mechanically align said parts in the desired relationship prior to engaging said hook and loop portions together in detachable fastening relationship.

Further advantages of the invention include economy of manufacture, ease of storage and transportation, compatibility and interchangeability of components, sufficient strength of the fastening material and much more rapid assembly and disassembly of the finished product.

In the latter case, and utilizing the example of a desk assembly with the hook and loop fastening and mechanical alignment system, the following steps are required once a total of four packages are unpacked. These packages may include four pieces, the top or desk panel, the back panel and two pedestals.

First the back panel is placed and engaged with the back of the two pedestals and then the top desk panel is placed on top of the pedestals.

Assembly of such a desk with the hook and loop fastening means takes less than one minute with one assembler as opposed to conventional desks which take up to five to ten minutes with two assemblers. Transporting and unpacking time is also reduced with fewer packages and the disassembly of the desk using the hook and loop fastening means is relatively simple. It is only necessary to pull off the top and back portions and the desk is ready to move and assemble at a new location and it should be stressed that no tools are necessary in either assembly or disassembly.

Furthermore, the simplicity of the fastening system overcomes many design problems of knock-down furniture systems thus resulting in flexibility as there is no need for components to be designed to accommodate any particular fastening system.

The components are designed for a number of uses as will hereinafter become apparent and then the hook and loop material together with the mechanical aligning means are strategically placed on all of the components to allow for easy and effortless interchangeability thereof.

This of course simplifies the manufacturing process because there are no fitments or mechanical couplers to be secured to the component surfaces which require pre-drilling, countersinking and attachment.

The hook and loop portions of the fastening material are simply glued or otherwise attached to the component surfaces thus eliminating concentrated stress points normally occurring with other types of coupling devices and because of the lack of concentration of the attaching load, there are no weak areas of the actual joining of two adjacent surfaces.

This of course means that manufacturing is not only more simple but less labour and capital intensive as the proposed system requires fewer manufacturing steps and less sophisticated machinery.

As mentioned previously, conventional coupling or joining systems necessitate the use of particle board of a minimum thickness of 1" in order to accommodate conventional fitments and in some instances, particle board of 1¼" in thickness is required.

By contrast, the proposed system can utilize ¾" (or less) particle board which is of a higher density, is less flexible and less prone to rupture thus reducing material costs by approximately 30% and having a product which is easier to handle and assemble, has less weight thus reducing freight charges and producing a finished product which is stronger and is less prone to warpage.

The most common occurrence of breakage with conventional systems is the breakup of the particle board at the concentrated stress points. These breaks are usually not repairable and therefore require replacement of one or more components. Even when repair is possible, the original strength is not restored to the repaired area. When utilizing hook and loop fastening material as in the present invention, there is no chance of particle board breakout and the system does not require additional components such as cross members or the like, to strengthen the product.

Another advantage of the present invention is that even particle board shrinks or expands with temperature and humidity and this can increase stress at concentrated stress points which occur in conventional systems thus causing breakage or looseness of the connecting fitments whereas the hook and loop fastening material allows expansion and contraction thus eliminating this problem.

In conventional systems, that employ suspended pedestals in their design, desk top warpage is a common problem whereas with the hook and loop attachment system described, full length pedestals can be utilized thus eliminating warpage as well as the need for end panels.

This means that there are fewer pieces to manufacture, ship and assemble thus reducing the incident of damage and space requirements for inventory at both wholesale and retail levels.

Conventional systems utilize a plurality of fastening devices whereas the present system uses only one fastening device for all system components and the simplicity of design allows interchangeability of components without the need of additional fastening devices.

Any seams between the hook and loop materials can be hidden or highlighted because the hook and loop material is currently available in a wide range of colors and of course additional colors may be ordered if desired.

These seams can form a conventional design feature known as a reveal strip which at the present time, must be added as an additional step in the manufacturing process.

With the foregoing in view, and other advantages as will become apparent to those skilled in the art to which this invention relates as this specification proceeds, the invention is herein described by reference to the accompanying drawings forming a part hereof, which includes a description of the best mode known to the applicant and of the preferred typical embodiment of the principles of the present invention, in which:

DESCRIPTION OF THE DRAWINGS

In the drawings like characters of reference indicate corresponding parts in the different figures.

DETAILED DESCRIPTION

In the enclosed description and drawings, knockdown type office furniture is shown including various components and divider panels but it will of course be appreciated that the sam principles of hook and loop material attachment of parts together with the mechanical prealigning of these parts is suitable for use in home furniture and in many other environments depending upon design parameters.

It will also be appreciated that although "Velcro" TM is mentioned, other hook and loop fasteners are obtainable from various sources all of which have similar components, namely, a flexible or substantially rigid base upon which rows of Nylon TM (or other plastic materials) hooks are formed on one portion and a similar base for the other portion which supports a mass of loops (formed from similar materials) engageable by the hooks of the first portion to provide an extremely strong bond therebetween which although readily peelable one from the other, nevertheless supplies sufficient strength for the attachment of the various parts described and claimed herein and is particularly resistant to shear and tension type stresses.

When utilizing relatively long lengths of such hook and loop material to attach panels such as desk top panels and backs, to supporting structures such as pedestals and the like, prealignment of the parts is an essential feature because of the difficulty in accurately positioning such panels upon the supporting structure surfaces and although the mechanical alignment means described and illustrated consists of dowels and apertures to receive same in the matching parts, nevertheless other mechanical alignment means may be utilized such as downwardly extending edge flanges and the like. Also, this mechanical prealignment adds rigidity to the assembled structure.

Proceeding therefore to describe the invention in detail, reference should be made to the attached drawings which are exemplary only and have been included and described to fully illustrate the principles of this invention, namely, to attach relatively rigid parts to one another utilizing hook and loop fastening material together with prealignment means so that the parts are accurately positioned just prior to the engagement of the fastening materials.

FIGS. 1 to 5 show the system utilized with an office desk and is illustrative and exemplary only.

Figure 1:
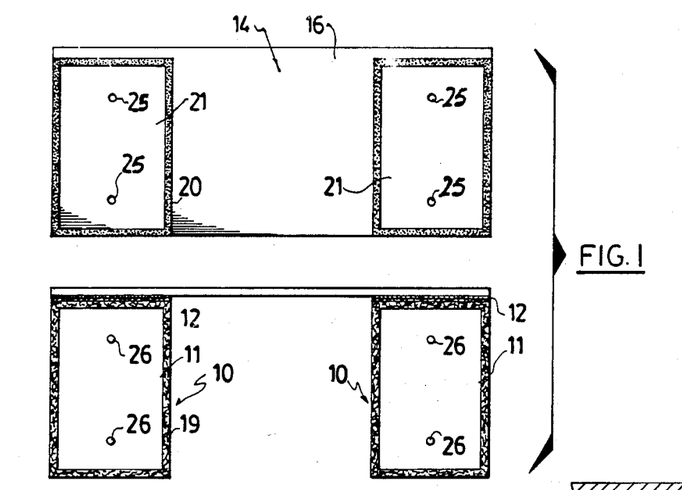
FIG. 1 is a schematic view of a desk assembly showing the two pedestals together with the desk top panel shown reversed and ready for installation.
Figure 2:
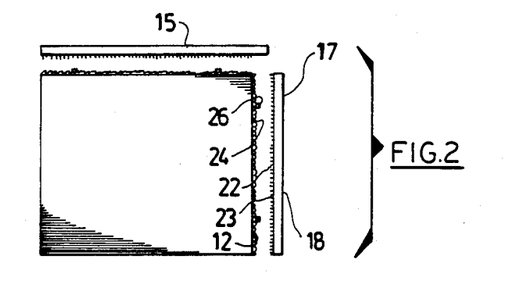
FIG. 2 is an exploded side view of the desk.

The desk shown in FIGS. 1 and 2 includes a pair of pedestals 10 having planar upper surfaces 11 and planar rear surfaces 12. Drawers and/or doors illustrated schematically by reference character 13 may be provided within the pedestals and construction thereof is conventional.

A desk top panel 14 comprises a substantially rectangular panel having any desired finish on the upper side 15 thereof and shown in FIG. 1 with the underside 16 facing uppermost.

Also provided is a substantially rectangular rear panel collectively designated 17 which is also a rectangular panel with any desired finish on the outer surface 18 and which will be positioned against the rear surfaces 12 of the pedestals when assembled.

Around the perimeter of the upper surfaces 11 of the pedestals, is secured, as by adhesive or other means, strips 19 of one portion of hook and loop fastening material with corresponding opposite strips of hook and loop material 20 being secured as by adhesive or the like around the areas 21 of the desk top panel which are to be engaged upon the two pedestals when the desk top panel is assembled thereon.

Similar strips of one portion of hook and loop material 22 are secured around and define the attaching area of the inner surface 23 of the rear panel with the opposite strips of hook and loop material 24 being secured around the perimeters of the rear panels 12 of the two pedestals. Although perimetrical locations are shown for the hook and loop material, other positions and/or configurations of such material may be used.

Figure 3:
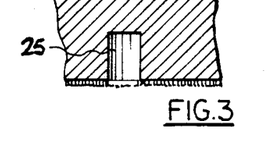
FIG. 3 is an enlarged fragmentary view showing one part of the mechanical alignment means.
Figure 4:
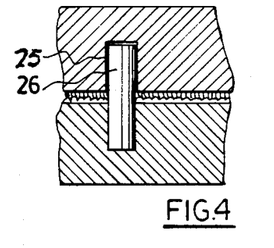
FIG. 4 is an enlarged fragmentary cross-sectional view showing the alignment device between two adjacent surfaces.
Figure 5:
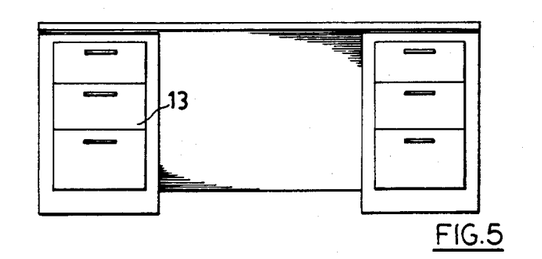
FIG. 5 is a front view of the assembled desk.

Mechanical prealigning means are provided between the upper surfaces of the pedestals and the underside of the desk top and between the inner surfaces of the rear panel and the rear surfaces of the pedestals and in all cases, these prealigning means, in the present embodiment, take a similar form and are illustrated in fragmentary enlarged views 3 and 4.

Drilled apertures (preferably blind apertures) 25 are formed in both mating surfaces and in alignment one with the other when the two surfaces are accurately positioned and a dowel 26 is engaged within the aperture 25 of the stationary component and extends perpendicularly therefrom and the length of these dowels is such that prior to engagement within the matching aperture 25, the mating portions 19 and 20 of the hook and loop materials are spaced apart and not in engagement with one another.

As an example in the desk shown in FIGS. 1 through 5, dowels 26 extend from corresponding apertures (not illustrated) in spaced apart relationship from the rear of the pedestals and similar dowels extend upwardly from the upper surfaces 11 of the two pedestals and it will be observed that there are two spaced apart dowels and corresponding apertures in both the upper and rear surfaces of the pedestals which are positioned approximately in the desired relationship one from the other.

The rear panel is then offered against the rear surface of one of the pedestals with the dowels extending from the panel, engaging the surface within the area defined by one portion of the hook and loop material. Movement of the rear panel relative to the pedestal permits the engagement of the dowels with the apertures in the rear panel thus ensuring that the accurate location has been obtained one with the other at which time the panel is pushed fully against the rear surface of the pedestal so that the hook and loop portions engage one with the other in detachable fastening relationship.

The other end of the panel is then positioned in a similar manner against the rear of the other pedestal and moved until the dowels engage the apertures 25 of this second pedestal. It will of course be appreciated that this second pedestal can be positioned fairly accurately prior to attempting to engage the dowels of the rear panel therewith.

Once the rear panel is attached, the top panel 14 is turned over and rested, by the dowels, upon the upper surface 11 of the two pedestals and moved about until the dowels engage the apertures 25 within the upper surface at which time the two mating surfaces of the hook and loop fastening material engage in detachable sealing relationship on with the other.

This completes the assembly of the desk which is accomplished rapidly and easily and provides the necessary stability due to the strength of the fastening material in both shear and tension and it has been found that vibration or weight during use increases the bonding between the two portions of the hook and loop material. It will also be appreciated at the same time that separation of the components is easily undertaken by the peeling action so that movement of the furniture from one location to another is easily accomplished.

Figure 6:
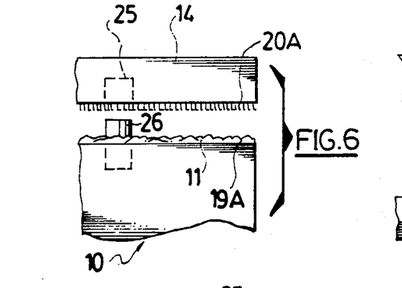
FIG. 6 is an exploded fragmentary view showing one method of junction between two adjacent parts.

In this particular embodiment described, it will be noted that one type of connection or joint has been described, namely, a surface upon a surface and this type of junction is illustrated in FIG. 6 as for example the engagement of the desk top panel 14 with the upper surface 11 of one pedestal 10. Dowel 26 is in alignment with aperture 25 just prior to the engagement of the hook and loop material which in this instance shows the loop material as indicated by reference character 19A and the hook material by reference character 20A although the material portions can of course be reversed if desired.

Figure 7:
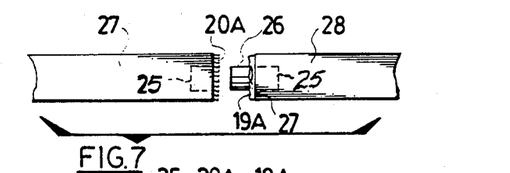
FIG. 7 shows an exploded fragmentary view illustrating an edge to edge connection.

FIG. 7 shows an edge to edge attachment means between, for example, a panel 27 and a further panel 28. In this type of attachment or fastening, dowels 26 extend from the edge 27 of one of the panels 28 engaging within an aperture 25 therein and also engaging within an aperture 25 in the other panel 27. Once again one portion 20A of the fastening material extends along the edge of panel 27 and the other portion 19A along the edge of the other panel 2 with the length of the dowel 26 extending from the surface being sufficient to engage the opposite surface prior to the alignment of the two panels and to the sealing engagement of the material portions 19A and 20A.

Figure 8:
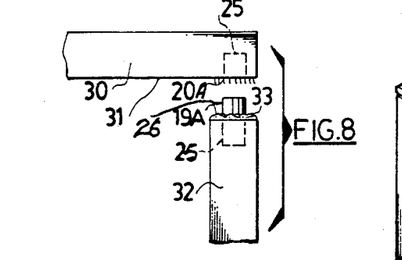
FIG. 8 is an exploded fragmentary view showing an edge to surface junction.

FIG. 8 shows a still further type of junction or joining of two parts in which a panel 30 includes one portion 20A of the hook and loop material secured along the edge of one planar surface 31 of the panel and having an aperture 25 formed perpendicular to this surface 31. The other panel or portion 32 includes one or more apertures 25 formed in the edge 33 into which dowel 26 may engage and with the other portion 19A being placed along this edge 33 thus forming a right angle junction between two panels or components when engaged as hereinbefore described.

Figure 9:
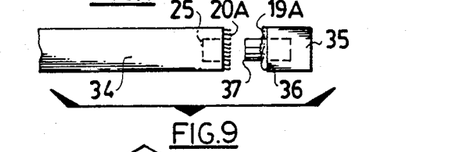
FIG. 9 is an exploded fragmentary view showing an edge to post junction.

FIG. 9 shows a still further type of junction or joint in which a panel 34 is provided with one portion of the hook and loop material 20A on one edge thereof together with an aperture 25 extending perpendicularly from the edge and a support post 35 having the other portion 19A of the hook and loop material secured along one face 36 thereof and a positioning dowel 26 extending therefrom to engage within the aperture 25 in the panel 34.

In the desk construction described and illustrated in FIGS. 1 through 5, all of the junctions are similar to that shown in FIG. 6.

Figure 10:
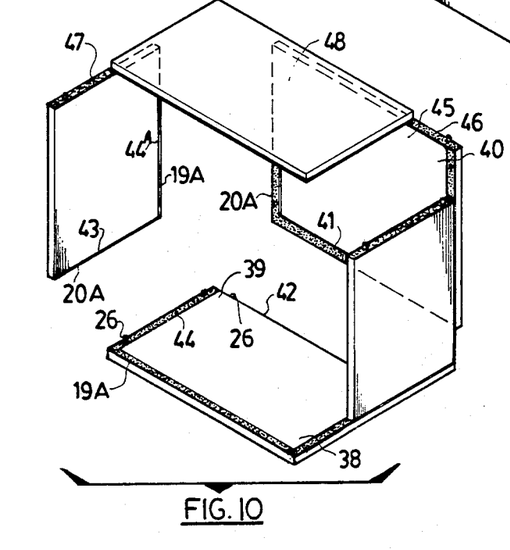
FIG. 10 is an exploded view of an open fronted cabinet utilizing the invention.
Figure 10A:
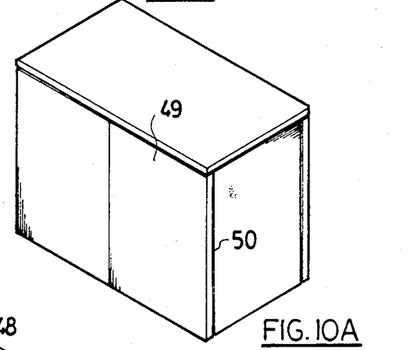
FIG. 10A shows an assembled cabinet of FIG. 10 but with doors added.

However with a cabinet such as illustrated in FIGS. 10 and 10A, all of the junctions are similar to that shown in FIG. 8.

In FIG. 10, a rectangular base panel 38 is shown having one portion of the hook and loop material 19A secured all around the perimeter of the upper surface 39 together with corresponding dowels 26 extending upwardly from the surface of the panel and in alignment with the other portion 19A of the material.

The rear panel 40 is also provided with one portion of the hook and loop material 20A on the lower edge 41 thereof together with apertures engageable by the dowels 26 extending from the rear edge 42 of the base panel and this rear panel is first located and then engaged upon the rear edge 42 of the base panel which is provided with the other portion of the hook and loop material (not illustrated).

The side panels are then engaged one after the other upon the base panel and the rear panel with the apertures in the lower edge 43 being located by and then engaged by dowels 26 extending upwardly from the side edges 44 of the base panel 38, it being understood that the hook and loop portions 19A and 20A are provided along the lower edges 43 of these side panels with similar strips 19A and 20A and dowels 26 extending along the vertical rear edges 44A of the side panels and the edges of the planar surface 45 of the rear panel.

Figure 11:
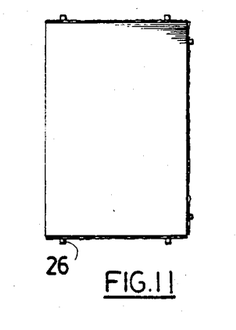
FIG. 11 is an end elevation of one of the end panels of FIG. 10.

Finally the dowels extending upwardly from the upper edge 46 of the rear panel and the upper edges 47 of the side panels are engaged by the corresponding edges of the top panel 48 prior to the engagement of the matching portions of the hook and loop material secured respectively to the underside planar surface of the top panel around the perimeter thereof and the upper edges 47 and 46 of the side panels and rear panel respectively. FIG. 11 shows the dowel and aperture relationship of one of the end panels 47 and FIG. 10A shows a cabinet such as that illustrated in FIG. 10 but with doors 49 hinged to the vertical front edges 50 of the side panels.

Figures 12, 14:
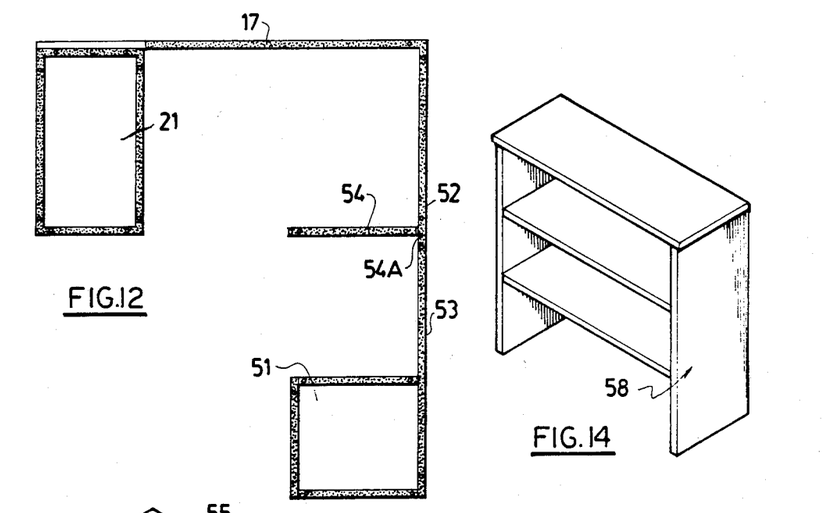
FIG. 12 is a top plan view of a secretarial desk without the upper or desk top panels attached.
FIG. 14 is an isometric view of a bookcase assembly.

FIG. 12 shows in plan view, the positioning of components for a secretarial desk which includes a pedestal 21, a rear panel 17, a return pedestal 51, a side panel 52, and a return side panel 53 together with a partial front panel 54A. The attachment of the rear panel 17 to the pedestal is similar to that described in FIG. 1 and the side panel 52 together with the partial front panel 54 are connected together with a junction similar to that illustrated and described in FIG. 8.

The rear panel 53 is secured to pedestal 51 in a manner similar to that of the rear panel 17 to pedestal 21 and the inner end 54 of the rear panel is secured to the edge of the side panel 52 in a manner similar to that shown in FIG. 7.

Figures 13, 15:
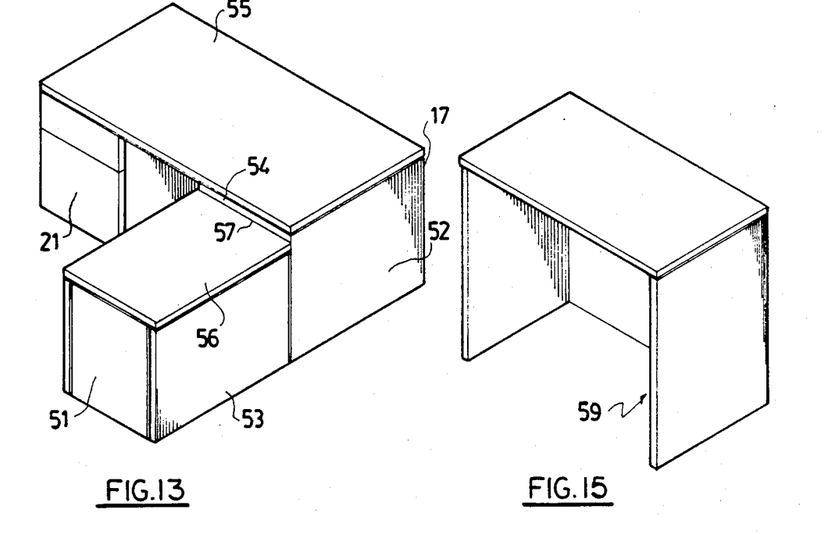
FIG. 13 is an isometric view of the completed desk of FIG. 12.
FIG. 15 is an isometric view of a desk unit with an open front and base.

Once assembled to this point, a desk top 55 is positioned on pedestal 21 and to the upper edges of the rear panel 17 and side panel 52 together with the upper edge of the partial front panel 54 all of which use locating dowels and apertures together with the oppositely coupling portions of the hook and loop material and FIG. 13 shows the assembled secretarial desk.

It will of course be appreciated that the return pedestal 51 and return rear panel 53 can be placed on the opposite side in place of pedestal 21 which may be situated on the opposite end of the desk top panel 55, it merely being necessary to disassemble the parts and reassemble in the desired arrangement. A top panel 56 engages the upper side of pedestal 51 and the rear panel 53 of the return and may also engage the lower side of the partial front panel 54, by the inner transverse edge 57 thereof.

FIG. 14 shows an example of an open shelved bookcase or the like collectively designated 58 utilizing similar joining principles and prealigning methods hereinbefore described and FIG. 15 shows an open type structure collectively designated 59 constructed in a similar manner.

Figures 16, 17, 18, 19, 20, 21:
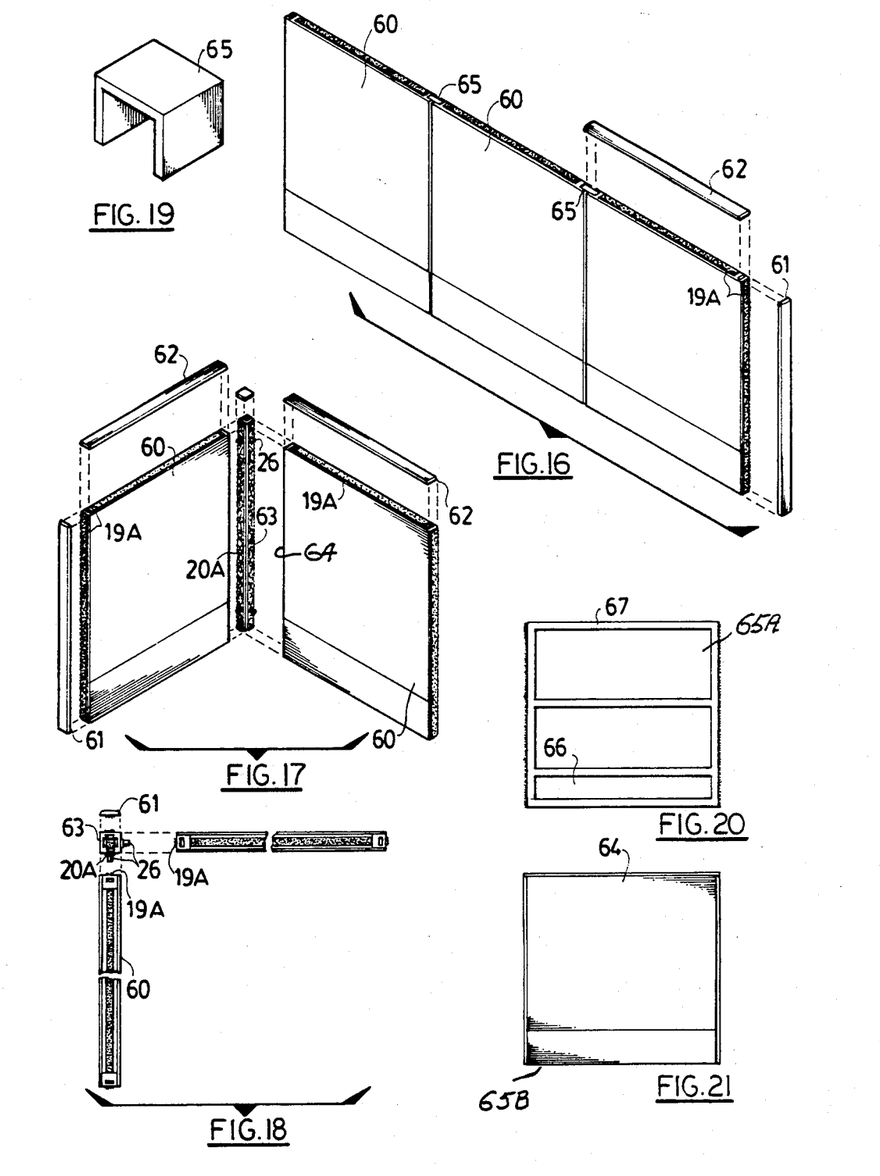
FIG. 16 is an isometric view of divider panels partially exploded.
FIG. 17 is a partially exploded view of divider panels and a corner post.
FIG. 18 is a top plan view of FIG. 17.
FIG. 19 is an isometric view of one of the C-clips.
FIG. 20 is a front elevation of an alternative panel frame.
FIG. 21 is a front elevation of a fabric covered panel which may be attached to the frame of FIG. 20.

FIG. 16 shows the alignment of divider panels 60 by utilizing junctions illustrated in FIG. 7 and including the prealigning dowel and aperture system hereinbefore described with end caps 61 engaging the free vertical edges in a conventional manner together with top caps 62.

FIG. 17 shows these panels in conjunction with a corner post 63 shown in exploded form in FIG. 18 with dowels 26 extending from the post and engaging in corresponding apertures within the vertical edges 64 of the panels 60, said edges 64 also having the one portion 19A of the hook and loop material secured thereto with the other portion 20A being secured along the vertical face against which the panels will engage when the dowels have been aligned with apertures within the edges 64 prior to the mating engagement of the hook and loop portions in detachable sealing relationship In all cases, C-clips 65 lock the two panels to one another and to the corner post but as such C-clips are conventional, it is not believed necessary to describe same further The panels 60 shown in FIGS. 17 and 18 may either be standard panels or may consist of panel frames as shown in FIG. 20 upon which fabric covered panels 65A may be secured together with base caps 65B covering the surface areas 66 of the panel frames 67 shown Once again various cap strips such as top caps 62 and end caps 61 may be attached in a conventional manner.

The various types of furniture illustrated are exemplary only and illustrate the flexibility of the hook and loop attaching system together with the mechanical prealigning by means of the dowels 26 and apertures or drillings 25.

The selected furniture pieces also illustrate the potential of interchangeability of parts. For example, the desk illustrated in FIGS. 1 through 5 consists of the four pieces, the upper panel 15, the back panel 17, and two prefabricated pedestals 21.

The dowels 26 are free fitting and their main purpose is to ensure proper alignment and the placement of the two components of the hook and loop material 19A and 20A used on any given surface, is determined by considerations of compatibility and interchangeability with other system components.

However, as mentioned above, they do add some rigidity to the assembled structure particularly to the panel system such as used, for example, in FIGS. 10, 14 and 15-20. In fact, additional dowels may be incorporated for this purpose.

The exact placement of the hook and loop strips or pads or dowels illustrated is only one configuration of the concept The secretarial desk shown in FIGS. 12 and 13 is adapted from the executive desk and consists of the identical pieces, namely, the upper or top desk panel 15, the rear panel 17, and one pedestal 21 together with the additional pieces such as end panel 52, partial front panel 54 and the secretarial return 51, 53, and 56.

The secretarial desk shown in FIGS. 12 and 13 may not only be changed from left to right return but can also be converted into an executive desk by replacing the end panel 52 and partial front panel 54 with a pedestal 21 and removing the secretarial return components and vice versa.

Similarly, the various bookcase and cabinet structures can all be shipped in a flat package and can be stacked one upon the other or can use one with doors and one without or separate doors for one or more shelves or full length doors and shelf height may also be adjusted readily. The structure shown in FIG. 15 is similar to the structure shown in FIG. 10 but without a base and without a shelf and the storage unit of FIG. 10A is also readily adapted from the bookcase whether it be two or three shelves in height.

Although the corner post shown in 17 and 18 illustrate a right angled junction between adjacent panels, nevertheless these are readily adapted for a three or four way panel junction or, alternatively, the corner posts may be constructed to effect 45 degrees or other corner angles desired.

The top caps and end caps are optional and offer design potential as do the base panels or caps 65B which cover the surface cavity 66 provided for electrical, telephonic and other services. These services may be provided continuously through the panel by means of punchouts (not illustrated) at the base of the vertical edge of each panel or by the means of plug units (not illustrated) at the base of the vertical edges of such panels. The punchouts on the base cap covers are provided for the installation of service outlets and the principle advantage of the system described is the use of hook and loop material for end to end connection of the panels in combination with the prealignment by mechanical means such as the dowels. This system is completely interchangeable and readily assembled and disassembled and the simplicity of the design lends itself to the incorporation of additional features presently in use with other divider or panel systems.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

I claim:

1. A knock-down kit of substantially rigid parts for the construction of furniture and the like comprising a plurality of parts and means to detachably fasten said parts together in the desired relationship to form the assembled furniture, said means including one portion of a hook and loop fastening material secured to the mating surface of one of said parts and the other portion of said hook and loop fastening material to the mating surface of the other of said parts, and means to mechanically align said parts in the desired relationship one with the other just prior to engaging said hook and loop portion together in detachable fastening relationship, said kit including a pair of floor engaging desk pedestals, a rear panel and a desk top panel, said hook and loop portions being secured in matching relationship, firstly on the mating surface of the upper side of said pedestals and on the mating surface of the underside of said desk top portion and secondly, upon the mating surfaces of the rear side of said pedestals and the mating surface of the inner side of said rear panel, said means to mechanically align said parts also engaging between the upper side of said pedestal and the under side of said top desk panel and between the rear sides of said pedestal and said rear panel, said means to mechanically align said parts comprises at least one dowel extending perpendicular from said mating surface of one of said parts and a matching aperture extending perpendicular from the mating surface of the other of said parts engageable with said dowel prior to the engagement of said portions of said hook and loop fastening material to one another in a detachable fastening relationship, and hook and loop portions being situated spaced from said dowels and said matching apertures.

2. The kit according to claim 1 in which one portion of said hook and loop fastening material is secured around the perimeter of the mating surface of the upper surface of said pedestal and the other portion is secured around a matching area upon the mating surface of the underside surface of said desk top panel, and at least two of said means to mechanically align said parts being spaced apart within the area bounded by said hook and loop fastening material.

* * * * *

UNITED STATES PATENT AND TRADEMARK OFFICE
CERTIFICATE OF CORRECTION

PATENT NO. : 4,883,331
DATED : November 28, 1989
INVENTOR(S) : Craig Mengel

It is certified that error appears in the above-identified patent and that said Letters Patent is hereby corrected as shown below:

TITLE PAGE:

In item [30] Foreign Application Priority Data
change "Canada.........548982" to --Canada......54$\underline{2}$982--

Signed and Sealed this

Seventh Day of May, 1991

Attest:

HARRY F. MANBECK, JR.

*Attesting Officer*  *Commissioner of Patents and Trademarks*

REEXAMINATION CERTIFICATE (1972nd)

United States Patent [19]

Mengel

[11] B1 4,883,331

[45] Certificate Issued     Apr. 6, 1993

[54] METHOD OF AND STRUCTURE FOR THE JOINING OF SUBSTANTIALLY RIGID PARTS TOGETHER

[76] Inventor: Craig Mengel, 2114 Robinson Street, Regina, Saskatchewan, Canada, S4T 2P7

Reexamination Request:
No. 90/002,607, Jan. 15, 1992

Reexamination Certificate for:
| | |
|---|---|
| Patent No.: | 4,883,331 |
| Issued: | Nov. 28, 1989 |
| Appl. No.: | 221,120 |
| Filed: | Jul. 19, 1988 |

Certificate of Correction issued May 7, 1991.

[30] Foreign Application Priority Data

Jul. 24, 1987 [CA] Canada .................................. 542982

[51] Int. Cl.⁵ .............................................. A47B 17/00
[52] U.S. Cl. ...................................... 312/195; 403/13; 312/257.1
[58] Field of Search ..................... 312/257.1, 195, 111; 108/157, 159; 403/13, 14; 24/306, 442; 52/DIG. 13, 582, 584, 586

[56] References Cited

U.S. PATENT DOCUMENTS

| | | |
|---|---|---|
| 3,658,107 | 4/1972 | Perina . |
| 3,971,608 | 7/1976 | Gans . |
| 4,439,971 | 4/1984 | Rutherford ............. 312/263 X |
| 4,491,166 | 1/1985 | Hanna ................. 52/DIG. 13 |
| 4,635,418 | 1/1987 | Hobgood ............... 52/DIG. 13 |

FOREIGN PATENT DOCUMENTS

| | | |
|---|---|---|
| 378043 | 6/1985 | Austria . |
| 1125236 | 3/1962 | Fed. Rep. of Germany . |
| 1309343 | 10/1962 | France . |
| 81710 | 9/1963 | France . |
| 2416671 | 9/1979 | France . |
| 50-37709 | 4/1975 | Japan . |
| 50-93912 | 8/1975 | Japan . |
| 51-11561 | 3/1976 | Japan . |
| 53-71002 | 6/1978 | Japan . |
| 53-114420 | 9/1978 | Japan . |
| 58-8352 | 1/1983 | Japan . |
| 58-43245 | 3/1983 | Japan . |
| 60-83429 | 6/1985 | Japan . |
| 61-136930 | 8/1986 | Japan . |
| 62-95627 | 6/1987 | Japan . |
| 2178651A | 2/1987 | United Kingdom . |

*Primary Examiner*—Peter R. Brown

[57] ABSTRACT

Conventionally, substantially rigid parts such as panels and the like, are joined by mechanical fitments or couplers which not only require tools to assemble and disassemble but also create concentrated stress points at the junctions where the fitments or couplers are located. The present device utilizes hook and loop coupling material to detachably secure the parts together and incorporate mechanical location and aligning means between the two parts just prior to the engagement of the hook and loop fastener portions with one another thus facilitating the accurate assembly of the parts. Although designed primarily for use in various types of knock-down furniture and the like, it can of course be adapted for use with other substantially rigid parts.

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claim 1 is determined to be patentable as amended.

Claim 2, dependent on an amended claim, is determined to be patentable.

1. A knock-down kit of substantially rigid parts for the construction of furniture and the like comprising a plurality of parts and means to detachably fasten said parts together in the desired relationship to form the assembled furniture, said means including one portion of a hook and loop fastening material secured to the mating surface of one of said parts and the other portion of said hook and loop fastening material to the mating surface of the other of said parts, and means to mechanically align said parts in the desired relationship one with the other just prior to engaging said hook and loop portion together in detachable fastening relationship, said kit including a pair of floor engaging desk pedestals, a rear panel and a desk top panel, *each pedestal having a substantially rectangular upper and rear sides with corresponding mating surfaces,* said hook and loop portions being secured in matching relationship, firstly on the mating surface of the upper side of said pedestals and on the mating surface of the underside of said desk top [portion] *panel* and secondly, upon the mating surfaces of the rear side of said pedestals and the mating surface of the inner side of said rear panel, said means to mechanically align said parts also engaging between the upper [side] *sides* of said [pedestal] *pedestals* and the under side of said *desk* top [desk] panel and between the rear sides of said pedestal and said rear panel, said means to mechanically align said parts comprises at least one dowel extending perpendicular from said mating surface of one of said parts and a matching *blind* aperture extending perpendicular from the mating surface of the other of said parts engageable with said dowel prior to the engagement of said portions of said hook and loop fastening material to one another in a detachable fastening relationship, and hook and loop portions being situated spaced from said dowels and said matching apertures.

* * * * *